2,890,964
VITREOUS ENAMEL COMPOSITION

Charles H. Commons, Jr., Malvern, and Wayne B. Shearer, Paoli, Pa., assignors to Foote Mineral Company, Philadelphia, Pa., a corporation of Pennsylvania No Drawing. Application December 12, 1955
Serial No. 552,252

8 Claims. (Cl. 106—48)

The present invention relates to a novel vitreous enamel composition; and, more particularly, the invention relates to a composition in the form of a frit adapted for use as a vitreous enamel and to the resulting enamel which is characterized by super-opacity and acid- and alkali-resistance.

In the field of porcelain enamel for coating metals there is a wide range of requirements for the finished product. In some cases, such as water heaters, milk containers, and the like, chemical durability is the important requirement, and enamels of good resistance to acid and alkali attack have been developed. Such enamels are dark in color and require relatively high firing temperatures, in the neighborhood of 1600–1650° F. One such acid- and alkali-resistant enamel which has been suggested contains 32–58% $SiO_2$, 6–16% $ZrO_2$, 4–9% $TiO_2$, 0–5% $ZnO$, 0–3.5% $P_2O_5$, 0–3.5% $Al_2O_3$, 6–14% $B_2O_3$, 13–20% $Na_2O$ and 2.5–11% $F_2$. However, the opacity of this enamel is far below the present day standards which require a reflectance of about 70% for a "white" enamel at about 25 grams of dry enamel per square foot. This enamel just reaches this figure of reflectance at about 55 grams per square foot.

On the other hand, in the manufacture of enamels for "appliances," such as refrigerators, stoves, washers, dryers, and the like, there are required, for esthetic appearance, enamels which are highly opaque, white and glossy, and which can be fired at moderately low temperatures, in the neighborhood of 1450–1500° F., to allow the use of lighter gauge metals. In the development of enamels for the appliance field, acid-resistance as well as high opacity have been considered of prime importance. More recently, however, with the use of stronger alkaline detergents, especially in automatic dishwashers and clothes washers where the enamel is subjected to hot water and alkali, alkali-resistance has become a primary requisite. Unfortunately, the super-opaque and acid-resistant appliance enamels have possessed poor alkali resistance.

It will be seen from the foregoing that the present day enamels are seriously deficient in at least one of the three primary properties: super-opacity, acid-resistance and alkali-resistance. The industry has been seeking an enamel possessing, in addition to these, the required white color, gloss and surface appearance and moderate firing characteristics.

It is the principal object of the present invention to provide a vitreous enamel composition which, in the form of an enamel, is resistant to acid and to alkali and is highly opaque.

It is another object of the present invention to provide a vitreous enamel composition which, in the form of an enamel, is both alkali- and acid-resistant as well as highly opaque and possesses the color, gloss and surface characteristics required for present day use on appliances.

A further object of the present invention is to provide a vitreous enamel composition not only possessing the characteristics discussed in the foregoing objects, but also which can be fired at moderate temperatures in the neighborhood of 1450–1500° F.

Still another object of the present invention is to provide a vitreous enamel composition possessing the characteristics discussed in the foregoing objects in the form of a frit as well as in the form of the final enamel.

Other objects will become apparent from a consideration of the following specification and the claims.

The vitreous enamel composition of the present invention is a titania-opacified enamel frit consisting essentially of certain specific materials within certain well defined ranges of proportions as follows (all percentages by weight): between about 11.2 and about 18.3%, of oxides of at least two of the alkali metals selected from the group consisting of sodium, potassium and lithium, from 0 to about 7.8% of at least one of the divalent oxides selected from the group consisting of CaO, BaO, MgO, PbO, SrO, and ZnO, between about 3.9 and about 17% of $B_2O_3$, from 0 to about 4.9% of $P_2O_5$, between about 0.5 and about 10% of $ZrO_2$, from 0 to about 4% of $Al_2O_3$, between about 37.5 and about 56.6% of $SiO_2$, between about 1.8 and about 6% of fluorine, and between about 16 and about 23% of $TiO_2$. In the preferred compositions the oxide analysis will be as follows: combined alkali metal oxides between about 13 and about 16%, divalent oxide between about 1.8 and about 5.8%, $B_2O_3$ between about 7.9 and about 11%, $P_2O_5$ between about 0.8 and about 2.9%, $ZrO_2$ in an amount between about 2 and about 6%, $Al_2O_3$ in an amount between about 0.5 and about 2%, $SiO_2$ in an amount between about 44 and about 52%, fluorine in an amount between about 2.5 and about 4.9% and $TiO_2$ in an amount between 18 and about 21%.

The vitreous enamels of the present invention have been found to possess many outstanding characteristics. Principal of these are super-opacity, acid-resistance and alkali-resistance. As mentioned above, present day requirements for opacity for "white" enamels dictate that the enamels possess a reflectance of at least about 70% in applications of 25 grams of dry enamel per square foot. The enamel compositions of the present invention all possess opacities higher than this, and the preferred compositions possess substantially higher opacities, even as high as 85%, or more, at the stated application rate. In many cases the present enamels possess opacities above 70% at application rates substantially lower than 25 grams per square foot of surface.

Referring to acid-resistance, an enamel is considered to be acid-resistant according to present day standards when it falls into the category of class A or better when tested by the "Test For Acid Resistance of Porcelain Enamels," part 1—Flatware, Bulletin T-7, Porcelain Enamel Institute, 1946. The enamel compositions of the present invention in general possess at least class A acid-resistance, and the preferred enamels possess even better acid-resistance, including classes A+, AA— and AA.

In the case of alkali-resistance, the presently favored test for determining alkali-resistance consists of subjecting a known area of surface of enamel to a boiling 5% sodium hydroxide solution under reflux conditions for six hours. The resulting loss in weight is reported as milligrams per square inch. We have adopted a figure of 20 milligrams per square inch as a suitable dividing point under these severe conditions of test. That is to say, those enamels which result in a loss of weight of no more than 20 milligrams per square inch under the stated test conditions are considered to possess alkali-resistance. All of the enamels of the present invention possess an alkali-resistance of less than 20 milligrams per square inch, and the preferred compositions possess much higher resistance to alkali, on the order of 5 to 10 milligrams per square inch.

The enamel compositions of the present invention are the first enamels, so far as is known, which possess these combined properties of super-opacity, acid-resistance and alkali-resistance. In addition to this, however, the present enamel compositions can be fired at moderately low temperatures, in the neighborhood of 1450–1500° F. so that they can readily be applied to lighter gauge metals and at a lower cost than would be the case with enamels which require significantly higher firing temperatures. Moreover, the enamels of the present invention all possess good gloss and surface characteristics.

The enamel compositions, in accordance with the broader aspects of the present invention, will comprise, in terms of oxide analysis, oxides of at least two of the alkali metals sodium, potassium and lithium; boron oxide ($B_2O_3$); zirconium oxide ($ZrO_2$); silica ($SiO_2$); fluorine (F) and titanium dioxide ($TiO_2$) within certain proportional ranges. Referring to the alkali metal content, the total amount of alkali metal oxide present is established by the workability, expansion characteristics and appearance of the compositions and the balance of the various other oxide constituents required for the above-discussed advantageous properties. Accordingly, the total alkali metal oxide content of the present enamels should not fall below about 11.2 nor exceed about 18.3%, and in the preferred compositions the total alkali metal oxide content will be between about 13 and about 16%. As stated, in the compositions of the present invention oxides of at least two of the alkali metals will be present, that is to say the compositions will comprise at least oxides of sodium and potassium, oxides of sodium and lithium, or oxides of lithium and potassium. In accordance with preferred practice, at least one of the alkali metal oxides present will be lithium oxide, since the presence of lithium oxide has been found to influence substantially the acid-resistance of the enamel and the moderately low firing temperature thereof. The presence of the oxides of the three stated alkali metals has been found to be particularly advantageous. In order to obtain the most advantageous results from a combination of two or more of the alkali metal oxides, it has been found that each of them should be present, in an amount of at least about 1% of the enamel composition. The boron oxide ($B_2O_3$) content of the present enamels should remain within the range stated above in order to provide proper workability combined with high opacity, alkali- and acid-resistance. Thus, with amounts of $B_2O_3$ less than about 3.9% the workability of the enamels falls off sharply whereas with amounts above about 17% the alkali resistance is reduced substantially. In the preferred enamel compositions, for optimum workability and alkali-resistance, the $B_2O_3$ is in an amount between about 7.9 and about 11%. The presence of zirconium oxide ($ZrO_2$) in proper amounts controls the acid-resistance and alkali-resistance of the enamels, and it has been found that amounts below about 0.5% result in sharply reduced alkali-resistance whereas amounts above about 10% result in sharply reduced workability. Hence, these figures establish the range of proportions for $ZrO_2$ in the present compositions generally. In the preferred enamel compositions, the $ZrO_2$ is in an amount between about 2 and about 6%. Since the compositions of the invention are essentially silicates, the silica ($SiO_2$) is the chief acid constituent, and the amount thereof in the compositions is dictated by this fact as well as by the proportions of the other necessary constituents required to provide the advantageous properties discussed herein. The $SiO_2$ will generally range between about 37.5% and about 56.6%, and, in the preferred compositions, between about 44 and about 52%. It has been found that the fluorine (F) content of the present compositions has a marked bearing on the workability, acid-resistance, color-stability and firing temperature. At fluorine contents below about 1.8%, the workability and color characteristics of the enamel fall off sharply, whereas at fluorine contents above about 5.9%, acid-resistance is lowered and the color-stability and firing stability of the enamel are poor.

The enamels of the present invention are titania-opacified enamels, that is to say the high opacity provided in the final enamels is due to precipitation of titania during the enamelling operation. The titania is an integral part of the frit, being dissolved therein, and is not incorporated with the frit as an additive during milling. To provide the high opacity mentioned above for the present enamel compositions, the $TiO_2$ content must be at least about 16% and may go as high as about 23%. In the preferred compositions, the $TiO_2$ content is between about 18 and about 21%.

As stated above, the enamel compositions may and preferably do contain small amounts of at least one of the divalent oxides selected from the group consisting of calcium oxide (CaO), barium oxide (BaO), magnesium oxide (MgO), strontium oxide (SrO), lead oxide (PbO) and zinc oxide (ZnO), phosphorus pentoxide ($P_2O_5$), and alumina ($Al_2O_3$). The presence of the divalent oxides in the present compositions, although not required, is highly beneficial, and thus amounts thereof up to about 7.8% are generally included. Above about 7.8% of divalent oxide the acid-resistance and workability of the enamels fall off sharply. Of the divalent oxides, ZnO and combinations of ZnO and MgO, are preferred. In the preferred compositions ZnO or a combination of ZnO and MgO is included in an amount between about 1.8 and about 5.8%. The presence of $P_2O_5$ is beneficial for optimum whiteness and reflectance-stability. However, in amounts of $P_2O_5$ above about 4.9%, the alkali-resistance of the enamel falls off. Accordingly, the compositions of the invention will generally contain no more than about 4.9% of $P_2O_5$. In the preferred compositions $P_2O_5$ is included in an amount between about 0.8 and about 2.9%. The presence of a small amount of $Al_2O_3$ does not deleteriously affect the valuable properties discussed herein. Since the present enamels possess a high tolerance for $Al_2O_3$, less expensive raw materials supplying one or more of the other constituents and containing this material may be employed for the sake of convenience and economy. Above about 4% $Al_2O_3$, however, acid-resistance falls off sharply. Hence, the compositions of the present invention will generally include no more than about 4% of $Al_2O_3$, and, in the preferred compositions, $Al_2O_3$ will be present in an amount between about 0.5 and about 2%.

The enamel composition of the present invention will consist essentially of the constituents discussed above in the stated amounts. This does not mean, however, that small amounts of other materials not deleteriously altering the advantageous characteristics of the enamel are excluded. For example, small amounts of $SnO_2$, $Sb_2O_3$, $MoO_3$, $Cb_2O_5$, and the like, such as in amounts up to about 1%, do not significantly deleteriously alter the desirable characteristics of the enamel, and may in some cases, be desirable for color control.

The compositional ranges and amounts referred to above are in terms of percent by weight, and refer to the proportions of the constituents in the frit and not to the composition of the final enamel inasmuch as these may be altered somewhat due to the addition of certain compounds to the frit in making up the enamel coating composition.

The composition, in the form of a frit, having the above-described chemical composition, may be prepared in accordance with conventional practice. As is well known, in preparing the frit, compounds ultimately providing the desired oxide analysis—in the present case providing the above-described oxide analysis—are mixed together in fine particle size and melted, and the molten mass quickly cooled, as by water-quenching, and dried. Compounds which may be employed to provide the above chemical oxide analysis are well known in the art, and the provision of the above-described oxide analysis will present no problem to those skilled in the vitreous enamel art. Thus, the alkali metal oxides may be provided, for example, by carbonates, phosphates, nitrates, minerals, and the like such as lithium carbonate, tribasic lithium phosphate, lithium phosphate, lithium nitrate, sodium carbonate, sodium phosphate, borax, potassium carbonate, and the like. The $B_2O_3$ may be provided by borates, such as borax, boric acid, and the like. The $ZrO_2$ may be provided by zirconium silicate, or by zirconia itself. $SiO_2$ may be provided by silica itself or by appropriate silicates, such as sodium silicates or minerals containing silica as well as one or more of the desired constituents. The fluorine may be provided by any of the alkali metal fluorides, such as sodium fluoride, lithium fluoride, and the like, and more complex fluorides, for instance sodium silicofluoride, and the like. It will be understood, of course, that during melting in the preparation of the frit, a certain amount of fluorine is lost due to volatilization, the exact amount depending upon the fritting procedure followed. The amount of the source of fluorine, therefore, will be selected to provide a theoretical fluorine content in the frit as specified above. The $TiO_2$ is provided by titania itself. The divalent oxides may be provided by suitable salts, such as carbonates, or the oxides themselves may be used. The $P_2O_5$ may be provided by suitable phosphates, such as one of those mentioned above. The $Al_2O_3$ will normally be provided by a mineral supplying one or more of the constituents mentioned above. One compound may provide some or all of a plurality of the above-mentioned oxides, for example, sodium phosphate may be relied upon to provide $Na_2O$ and $P_2O_5$. In any event, the compounds will be selected in accordance with well known practice to provide the proper oxide analysis, and in the event such compounds contain a constituent not desired in the ultimate frit, such constituent will be of a volatile nature so that it may be removed during heating and melting of the mixture. For example, where carbonates are employed, carbon dioxide is liberated, and where ammonium compounds, such as ammonium phosphate are employed, the ammonia is liberated.

The materials, in fine particle size, providing the desired chemical analysis upon heating and melting thereof, are mixed together in accordance with common practice, and heated to an elevated temperature to provide a molten, pourable mass. With the compositions of the present invention, temperatures in the neighborhood of from about 2200 to about 2350° F. may be employed to provide the molten mass. The molten mass is then quickly chilled, such as by pouring it into a water bath, and such quick chilling causes the glass-like mass to fracture into small pieces. These small pieces are recovered and dried.

The resulting frit is too coarse for direct use as an enamelling composition and may, therefore, be ground to the desired size in accordance with well known practice.

Additives of the type normally incorporated in vitreous enamelling compositions may be added to the frit. For example, it is normally the practice to incorporate a suspending agent in the composition, usually during milling of the frit. These suspending agents, such as enamelling clays, bentonite, sodium silicate, and the like, may be added to the frit either as a solid or as a dispersion in water. Similarly, an electrolyte salt is also normally added to the composition to flocculate the composition when water is added thereto controlling the viscosity of the resulting slip. Examples of such salts are the water-soluble—particularly the alkali metal—chlorides, carbonates, nitrates, phosphates, and the like. A preliminary binder imparting strength to the coating until it is fired, such as gum tragacanth, may also be included in the composition. As stated, in the composition of the present invention, the titania in the frit serves as the ultimate opacifying agent. Hence, it is not necessary to add an opacifying agent to the frit, such as during milling.

The milled composition comprising the frit and the desired additives and sufficient water to provide the slip is then applied to the desired metal surface, as by spraying, brushing, or the like. The coating is then dried and fired to cause the coating to fuse and to vitrify into a continuous white, opaque, glassy coating. The firing of the coating follows well known procedures; however, as stated, an important feature of the compositions of the present invention is their ability to be fired at moderately low temperatures, in the neighborhood of 1450–1500° F. Many of the enamels may even be fired at temperatures as low as about 1420° F.

The compositions of the present invention and their preparation as well as their advantageous properties will be more readily understood from consideration of the following specific examples, which are given for the purpose of illustration only and are not intended to limit the scope of the invention in any way.

EXAMPLES I–XXXIX

Thirty-nine frits, having different theoretical compositions as set forth in the tables, are prepared below following conventional practice but employing compounds and materials ultimately providing, after melting and fritting, the theoretical oxide analysis set forth in the tables. The clear melt formed in each case is poured into water to quench and shatter the glass into easily friable particles. The water is drained from the solids, and the frit is then dried. Each frit is prepared into a standard mill mix consisting of:

| | |
|---|---|
| Frit _____ grams__ | 1000 |
| Enamelling clay _____ do____ | 40 |
| Potassium carbonate _____ do____ | 2.5 |
| Potassium chloride _____ do____ | 2.5 |
| Bentonite _____ do____ | 1.25 |
| Gum tragacanth _____ do____ | .31 |
| Water _____ cc__ | 420 |

The mill mixes are ball milled for about four hours until 2 grams (±1 gram) of residue remain on a 200 mesh screen when 50 cc. of slip are washed through the screen. Each slip is then removed from the ball mill, and sprayed onto one side of a ground-coated sheet steel panel at the rate of 25 grams of dry enamel per square foot of surface. Each panel is then fired at 1450–1500° F. Opacity is measured on a Hunter Reflectometer using three color filters. Acid- and alkali-resistance tests are made on the normal fired specimens in accordance with the tests described previously herein. Acid- and alkali-resistance and opacity are set forth in the tables for each of the compositions.

*Tables*

| | I | II | III | IV | V | VI |
|---|---|---|---|---|---|---|
| $SiO_2$ | 48.80 | 46.79 | 44.78 | 42.77 | 42.78 | 48.61 |
| $B_2O_3$ | 10.01 | 10.01 | 10.01 | 10.01 | 7.99 | 7.99 |
| $K_2O$ | 5.06 | 5.06 | 5.06 | 5.06 | 5.06 | 5.06 |
| $Na_2O$ | 4.69 | 4.69 | 4.69 | 4.69 | 4.69 | 4.69 |
| $Li_2O$ | 3.58 | 3.58 | 3.58 | 3.58 | 3.58 | 3.58 |
| $F_2$ | 2.91 | 2.91 | 2.91 | 2.91 | 2.91 | 2.91 |
| $P_2O_5$ | 0.88 | 0.88 | 0.88 | 0.88 | 0.88 | 0.88 |
| ZnO | 1.81 | 1.81 | 1.81 | 1.81 | 1.81 | 0.00 |
| $ZrO_2$ | 2.01 | 4.02 | 6.03 | 8.04 | 10.05 | 6.03 |
| $Al_2O_3$ | 0 | 0 | 0 | 0 | 0 | 0 |
| $TiO_2$ | 20.25 | 20.25 | 20.25 | 20.25 | 20.25 | 20.25 |
| Acid Resistance | AA− | AA | AA | AA− | A | AA |
| Alkali Resistance, mg./sq. in. | 18.6 | 13.1 | 8.86 | 7.41 | 6.04 | 8.99 |
| Green Reflectance, 25 gms./sq. ft. Application | 76.8 | 75.8 | 77.8 | 78.3 | 77.4 | 77.6 |

Tables—Continued

|  | VII | VIII | IX | X | XI |
|---|---|---|---|---|---|
| $SiO_2$ | 46.80 | 44.79 | 42.78 | 40.77 | 42.77 |
| $B_2O_3$ | 7.99 | 7.99 | 7.99 | 14.02 | 12.02 |
| $K_2O$ | 5.06 | 5.06 | 5.06 | 5.06 | 5.06 |
| $Na_2O$ | 4.69 | 4.69 | 4.69 | 4.69 | 4.69 |
| $Li_2O$ | 3.58 | 3.58 | 3.58 | 3.58 | 3.58 |
| $F_2$ | 2.91 | 2.91 | 2.91 | 2.91 | 2.91 |
| $P_2O_5$ | 0.88 | 0.88 | 0.88 | 0.88 | 0.88 |
| ZnO | 1.81 | 3.82 | 5.83 | 1.81 | 1.81 |
| $ZrO_2$ | 6.03 | 6.03 | 6.03 | 6.03 | 6.03 |
| $Al_2O_3$ | 0 | 0 | 0 | 0 | 0 |
| $TiO_2$ | 20.25 | 20.25 | 20.25 | 20.25 | 20.25 |
| Acid Resistance | AA | AA− | A | A+ | A |
| Alkali Resistance, mg./sq. in. | 7.22 | 5.28 | 8.91 | 16.40 | 10.0 |
| Green Reflectance, 25 gms./sq. ft. Application | 78.5 | 82.4 | 82.1 | 80.1 | 79.4 |

|  | XII | XIII | XIV | XV | XVI |
|---|---|---|---|---|---|
| $SiO_2$ | 48.81 | 45.79 | 45.79 | 47.81 | 44.81 |
| $B_2O_3$ | 5.98 | 8.16 | 8.16 | 7.99 | 7.99 |
| $K_2O$ | 5.06 | 5.49 | 5.00 | 4.68 | 5.86 |
| $Na_2O$ | 4.69 | 5.11 | 4.60 | 4.33 | 5.35 |
| $Li_2O$ | 3.58 | 3.01 | 4.01 | 3.31 | 4.11 |
| $F_2$ | 2.91 | 2.97 | 2.97 | 2.91 | 2.91 |
| $P_2O_5$ | 0.88 | 0.89 | 0.89 | 0.88 | 0.88 |
| ZnO | 1.81 | 3.91 | 3.91 | 1.81 | 1.81 |
| $ZrO_2$ | 6.03 | 6.16 | 6.16 | 6.03 | 6.03 |
| $Al_2O_3$ | 0 | 0 | 0 | 0 | 0 |
| $TiO_2$ | 20.25 | 18.51 | 18.51 | 20.25 | 20.25 |
| Acid Resistance | AA | AA | AA | AA | AA |
| Alkali Resistance, mg./sq. in. | 9.90 | 10.3 | 8.9 | 7.53 | 8.10 |
| Green Reflectance, 25 gms./sq. ft. Application | 82.8 | 76.7 | 82.7 | 71.0 | 84.2 |

|  | XVII | XVIII | XIX | XX | XXI | XXII |
|---|---|---|---|---|---|---|
| SiO | 43.79 | 45.80 | 41.78 | 44.79 | 41.78 | 41.67 |
| $B_2O_3$ | 7.99 | 7.99 | 7.99 | 7.99 | 10.01 | 10.01 |
| $K_2O$ | 6.21 | 4.68 | 6.21 | 5.06 | 6.20 | 8.40 |
| $Na_2O$ | 5.74 | 4.33 | 5.74 | 4.69 | 5.74 | 8.04 |
| $Li_2O$ | 4.39 | 3.31 | 4.39 | 3.58 | 4.39 | 0 |
| $F_2$ | 2.91 | 2.91 | 2.91 | 2.91 | 2.91 | 2.91 |
| $P_2O_5$ | 0.88 | 2.89 | 2.89 | 2.89 | 0.88 | 0.88 |
| ZnO | 1.81 | 1.81 | 1.81 | 1.81 | 1.81 | 1.81 |
| $ZrO_2$ | 6.03 | 6.03 | 6.03 | 6.03 | 6.03 | 6.03 |
| $Al_2O_3$ | 0 | 0 | 0 | 0 | 0 | 0 |
| $TiO_2$ | 20.25 | 20.25 | 20.25 | 20.25 | 20.25 | 20.25 |
| Acid Resistance | AA | AA | A+ | AA | A+ | A+ |
| Alkali Resistance, mg./sq. in. | 7.64 | 10.2 | 10.8 | 11.1 | 12.7 | 13.0 |
| Green Reflectance, 25 gms./sq. ft. Application | 85.2 | 70.6 | 83.0 | 77.8 | 85.6 | 72.2 |

|  | XXIII | XXIV | XXV | XXVI | XXVII | XXVIII |
|---|---|---|---|---|---|---|
| $SiO_2$ | 47.68 | 45.79 | 44.79 | 43.79 | 44.18 | 48.18 |
| $B_2O_3$ | 7.99 | 7.99 | 7.99 | 7.99 | 9.95 | 9.95 |
| $K_2O$ | 5.06 | 5.06 | 5.06 | 5.06 | 6.72 | 6.72 |
| $Na_2O$ | 4.69 | 4.69 | 4.69 | 4.69 | 4.03 | 4.03 |
| $Li_2O$ | 3.58 | 3.58 | 3.58 | 3.58 | 3.50 | 3.50 |
| $F_2$ | 2.91 | 3.92 | 4.92 | 5.92 | 2.89 | 2.89 |
| $P_2O_5$ | 0 | 0.88 | 0.88 | 0.88 | 0.87 | 0.87 |
| ZnO | 1.81 | 1.81 | 1.81 | 1.81 | 1.80 | 1.80 |
| $ZrO_2$ | 6.03 | 6.03 | 6.03 | 6.03 | 6.00 | 2.00 |
| $Al_2O_3$ | 0 | 0 | 0 | 0 | 0 | 0 |
| $TiO_2$ | 20.25 | 20.25 | 20.25 | 20.25 | 20.06 | 20.06 |
| Acid Resistance | AA | A+ | A+ | A | A | AA |
| Alkali Resistance, mg./sq. in. | 8.63 | 8.02 | 6.75 | 10.05 | 8.19 | 17.31 |
| Green Reflectance, 25 gms./sq. ft. Application | 76.4 | 79.1 | 78.9 | 78.3 | 77.5 | 81.5 |

|  | XXIX | XXX | XXXI | XXXII | XXXIII | XXXIV |
|---|---|---|---|---|---|---|
| $SiO_2$ | 43.18 | 48.14 | 42.43 | 42.18 | 44.18 | 40.18 |
| $B_2O_3$ | 9.95 | 7.99 | 9.95 | 13.20 | 9.95 | 9.95 |
| $K_2O$ | 6.72 | 5.06 | 3.50 | 6.13 | 6.72 | 6.72 |
| $Na_2O$ | 4.03 | 4.69 | 10.50 | 3.68 | 4.03 | 4.03 |
| $Li_2O$ | 3.50 | 3.58 | 2.00 | 3.19 | 3.50 | 3.50 |
| $F_2$ | 2.89 | 2.91 | 2.89 | 2.89 | 2.89 | 2.89 |
| $P_2O_5$ | 0.87 | 0.88 | 0.87 | 0.87 | 0.87 | 0.87 |
| ZnO | 1.80 | 1.81 | 1.80 | 1.80 | 1.80 | 1.80 |
| $ZrO_2$ | 5.00 | 4.02 | 6.00 | 6.00 | 3.00 | 10.00 |
| $Al_2O_3$ | 2.00 | 0.67 | 0 | 0 | 3.00 | 0 |
| $TiO_2$ | 20.06 | 20.25 | 20.06 | 20.06 | 20.06 | 20.06 |
| Acid Resistance | A | AA | A | A | A | A |
| Alkali Resistance, mg./sq. in. | 9.75 | 9.85 | 13.77 | 17.65 | 16.15 | 7.11 |
| Green Reflectance, 25 gms./sq. ft. Application | 80.03 | 77.9 | 71.0 | 76.0 | 81.4 | 77.2 |

|  | XXXV | XXXVI | XXXVII | XXXVIII | XXXIX |
|---|---|---|---|---|---|
| $SiO_2$ | 44.18 | 44.18 | 44.18 | 44.18 | 44.18 |
| $B_2O_3$ | 9.95 | 9.95 | 9.95 | 9.95 | 9.95 |
| $K_2O$ | 6.72 | 6.72 | 6.72 | 6.72 | 6.72 |
| $Na_2O$ | 4.03 | 4.03 | 4.03 | 4.03 | 4.03 |
| $Li_2O$ | 3.50 | 3.50 | 3.50 | 3.50 | 3.50 |
| $TiO_2$ | 20.06 | 20.06 | 20.06 | 20.06 | 20.06 |
| $F_2$ | 2.89 | 2.89 | 2.89 | 2.89 | 2.89 |
| $P_2O_5$ | 0.87 | 0.87 | 0.87 | 0.87 | 0.87 |
| $ZrO_2$ | 6.00 | 6.00 | 6.00 | 6.00 | 6.00 |
| ZnO | 0.80 | 0.80 | 0.80 | 0.80 | 0.80 |
| BaO | 1.00 |  |  |  |  |
| MgO |  | 1.00 |  |  |  |
| CaO |  |  | 1.00 |  |  |
| SrO |  |  |  | 1.00 |  |
| PbO |  |  |  |  | 1.00 |
| Alkali Resistance, mg./sq. inch | 12.87 | 7.87 | 8.88 | 12.79 | 12.75 |
| Acid Resistance | A | AA | A+ | AA− | AA |
| Reflectance | 82.4 | 88.6 | 74.4 | 80.0 | 79.8 |

Considerable modification is possible in the selection of the particular combination of constituents and amounts thereof without departing from the scope of the present invention.

We claim:

1. A vitreous enamel composition in the form of a frit consisting essentially of between about 13 and about 16% of the oxides of at least two of the alkali metals selected from the group consisting of sodium, lithium and potassium, between about 1.8 and about 5.8% of at least one of the divalent oxides selected from the group consisting of CaO, BaO, MgO, SrO, PbO and ZnO, between about 7.9 and about 11% of $B_2O_3$, between about 0.8 and about 2.9% of $P_2O_5$, between about 2 and about 6% of $ZrO_2$, between about 44 and about 52% of $SiO_2$, between about 2.5 and about 4.9% of fluorine and between about 18 and about 21% of $TiO_2$, said percentages being on the weight basis.

2. The frit of claim 1 wherein one of the alkali metal oxides is lithium oxide.

3. The frit of claim 2 wherein the oxides of sodium, lithium and potassium are present.

4. The frit of claim 1 wherein $Al_2O_3$ is present in an amount between about 0.5 and about 2%.

5. The frit of claim 4 wherein one of the alkali metal oxides is lithium oxide.

6. The frit of claim 5 wherein the oxides of sodium, lithium and potassium are present.

7. The frit of claim 1 wherein the divalent oxide comprises ZnO.

8. The frit of claim 3 wherein the divalent oxide comprises ZnO.

References Cited in the file of this patent

UNITED STATES PATENTS

| 1,949,479 | Kinzie et al. | Mar. 6, 1934 |
| 1,988,800 | Kinzie et al. | Jan. 22, 1935 |

FOREIGN PATENTS

| 688,787 | Germany | 1940 |